United States Patent

Yamamoto et al.

[11] Patent Number: 5,958,313
[45] Date of Patent: *Sep. 28, 1999

[54] PURGING AGENT

[75] Inventors: Tomoyuki Yamamoto; Masahiko Toyozumi; Koji Kita, all of Ibaraki, Japan

[73] Assignee: Nippon Gohsei Kagaku Kogyo Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/826,386

[22] Filed: Apr. 9, 1997

[30] Foreign Application Priority Data

| Apr. 11, 1996 | [JP] | Japan | 8-115823 |
| Jun. 26, 1996 | [JP] | Japan | 8-218155 |
| Jun. 26, 1996 | [JP] | Japan | 8-218156 |

[51] Int. Cl.$^6$ .................................................. B28B 7/04
[52] U.S. Cl. ......................................... 264/39; 264/176.1
[58] Field of Search ..................................... 524/232, 291, 524/388, 503; 264/39, 176.1

[56] References Cited

U.S. PATENT DOCUMENTS

| 4,430,289 | 2/1984 | McKinney | 524/232 |
| 4,619,957 | 10/1986 | Reid | 524/291 |
| 4,670,491 | 6/1987 | Stretanski | 524/291 |
| 4,745,147 | 5/1988 | Honsberg | 524/388 |
| 4,749,736 | 6/1988 | Khanna | 524/230 |
| 4,785,042 | 11/1988 | Azuma | 524/232 |
| 4,812,504 | 3/1989 | Su | 524/229 |
| 5,032,633 | 7/1991 | Schlobohm | 524/291 |
| 5,104,917 | 4/1992 | Raevsky | 524/423 |
| 5,143,956 | 9/1992 | Pielartzik | 524/291 |
| 5,194,184 | 3/1993 | Takeyama | 524/436 |
| 5,252,651 | 10/1993 | Criquilion | 524/388 |
| 5,254,380 | 10/1993 | Salyer | 524/493 |
| 5,449,711 | 9/1995 | Saito | 524/388 |
| 5,480,932 | 1/1996 | Kobayashi | 524/388 |
| 5,492,953 | 2/1996 | Itamura | 525/60 |
| 5,506,297 | 4/1996 | Uehara | 524/320 |
| 5,510,413 | 4/1996 | McCullough | 524/451 |

FOREIGN PATENT DOCUMENTS

| 62-117712 | 5/1987 | Japan . |
| 1-178545 | 7/1989 | Japan . |
| 2-60727 | 3/1990 | Japan . |
| 4-187410 | 7/1992 | Japan . |
| 5-269754 | 10/1993 | Japan . |
| 5-279518 | 10/1993 | Japan . |

*Primary Examiner*—Paul R. Michl
*Attorney, Agent, or Firm*—Armstrong, Westerman, Hattori, McLeland & Naughton

[57] ABSTRACT

A purging agent for purging the resin to be purged from an extruder in a melt extrusion apparatus is provided which comprises (A) a hydrophobic thermoplastic resin, (B) a hydrophilic thermoplastic resin and (C) a purging auxiliary selected from the group consisting of (C1) a plasticizer for the resin to be purged, (C2) water and (C3) a crystal water-containing compound, the proportions of the hydrophobic thermoplastic resin (A) and hydrophilic thermoplastic resin (B) being 100/0 to 30/70 by weight and the proportion of the purging auxiliary (C) relative to 100 weight parts of the sum total of the hydrophobic thermoplastic resin (A) plus hydrophilic thermoplastic resin (B) being 0.01 to 40 weight parts.

14 Claims, No Drawings

PURGING AGENT

FIELD OF THE INVENTION

The present invention relates to a purging agent or purging resin composition for purging such resins as a saponified ethylene-vinyl acetate copolymer (hereinafter briefly referred to as EVOH), a polyvinyl alcohol resin (hereinafter briefly referred to as PVA) and a polyamide resin (hereinafter briefly referred to as PA) in extrusion molding machines and, more particularly, to a purging agent with which said resins remaining in the melt flow path of extruders are quickly extruded and with which marked improvements can be achieved with respect to defective products due to foreign matters, striate and the like resulting from the remnants of the purging agent when such a resin is again introduced into said flow path.

PRIOR ART

Such resins as EVOH, PVA and PA are superior in gas barrier property and therefore have so far been used in producing food packaging films and containers.

However, on the occasion of such molding, when such resin is submitted to melt-extrusion molding for a long period of time, said resin is retained in the resin flow path, resulting in gelation, deterioration, decomposition or the like to thereby cause striation on the products or mixing in of gels (gel particles) or hard spots (stones) into the products to render them deficient. Furthermore, on the occasion of restarting the melt extrusion apparatus following suspension of operation thereof, the gels of and decomposition products from said resin remaining in the resin flow path are discharged over a long period of time and this results in great losses of time and products until normal products can be obtained.

To overcome these problems, the prior art uses high-density polyethylene (HDPE), low-density polyethylene (LDPE), linear low-density polyethylene (LLDPE), polystyrene (PS), polypropylene (PP) or the like as a purging agent (purging resin) for replacing (purging) the resin within the resin flow path either upon occurrence, during a prolonged period of operation, of an abnormality such as striation or formation of gels or hard spots or when the operation is to be suspended.

Furthermore, for shortening the purging period, a purging agent higher in viscosity than the resin to be purged such as EVOH, PVA or PA is used, or the extrusion temperature is lowered, or the discharge amount is increased. However, these and other methods have problems; for example the purging agent is required in large amounts or the procedure is complicated. The use of a purging agent higher in viscosity than the resin to be purged indeed reduces the time for changeover from the resin to be purged to the purging agent but, conversely, on the occasion of changeover from the purging agent to the resin to be purged, generation of gels and/or hard spots as resulting from the purging agent continues for a long period, increasing the product loss. For achieving improvements in this respect, a procedure is in use which comprises, for instance, on the occasion of changeover from the purging agent to the resin to be purged, changing over the purging agent first to one or ones having stepwise decreased viscosities, or varying the extrusion temperature. However, such procedure is complicated and causes a great loss of time.

Therefore, for the purpose of removing gels, hard spots and striate in a short time and thus reducing the time required until normal product formation on the occasion of changeover from the purging agent to the resin to be purged or of restarting of the melt-extrusion apparatus after suspension, Japanese Kokai Tokkyo Koho H01-178545 discloses a purging agent comprising a blend of EVOH with a polyamide/polyether copolymer, a polyester/polyether copolymer, a polyamide/polyester/polyether copolymer or the like, Japanese Kokai Tokkyo Koho H05-279518 discloses a purging agent comprising a polyolefin or a polyolefin (/EVOH blend) with a bivalent metal salt added thereto, Japanese Kokai Tokkyo Koho H05-269754 discloses a purging agent comprising such a resin as EVOH that meets a specific melt index requirement, Japanese Kokai Tokkyo Koho S62-117712 discloses a purging agent comprising a high-melt-viscosity polyester resin and water admixed therewith, Japanese Kokai Tokkyo Koho H4-187410 discloses a purging agent comprising a mixture of a high-viscosity resin and a foaming or blowing agent-containing low-viscosity resin and water admixed therewith and, further, Japanese Kokai Tokkyo Koho S62-176817 discloses a purging agent comprising a high-melt-viscosity polyester resin and a crystal water-containing compound admixed therewith.

However, the purging agent disclosed in Japanese Kokai Tokkyo Koho H01-178545 is itself poor in stability since EVOH and a polyamide elastomer are used therein, hence may allow generation of foreign matters such as gels or hard spots even during purging. The purging agent disclosed in Japanese Kokai Tokkyo Koho H05-279518, upon detailed checking by the present inventors, revealed that the purging agent remains, though in small amounts, within the extruder (on the metal surface) after purging; this may possibly lead to foreign matter generation in the same manner as mentioned above. The purging agent disclosed in Japanese Kokai Tokkyo Koho H05-269754 has problems in that an offensive smell may possibly be given off because of the low viscosity resulting from heating (300 minutes of heating resulting in a very low viscosity), to impart the smell to the products. The purging agents disclosed in Japanese Kokai Tokkyo Koho S62-117712 and H04-187410 have the drawback that the dischargeability of purging agent on the occasion of changeover from the purging agent to a resin to be molded is poor because of the high melt viscosity. The purging agent disclosed in Japanese Kokai Tokkyo Koho S62-176817 has the same drawback.

With such background, the present invention has for its object to provide a purging agent with which the purging time can be shortened and the product loss can be reduced and which has good thermal stability and makes it possible to carry out more efficient purging without fear of offensive smell emission.

SUMMARY OF THE INVENTION

The purging agent according to the invention, which is to purge resins to be purged from the extruder of a melt extrusion apparatus, comprises (A) a hydrophobic thermoplastic resin, (B) a hydrophilic thermoplastic resin and (C) at least one purging auxiliary selected from the group consisting of (C1) a plasticizer for the resin to be purged, (C2) water and (C3) a crystal water-containing compound, wherein the proportions of the hydrophobic thermoplastic resin (A) and hydrophilic thermoplastic resin (B) are 100/0 to 30/70 and the proportion of the purging auxiliary (C) relative to 100 weight parts of the sum total of the hydrophobic thermoplastic resin (A) plus hydrophilic thermoplastic resin (B) is 0.01 to 40 weight parts.

DETAILED DESCRIPTION OF THE INVENTION

In the following, the present invention is explained in further detail.

The hydrophobic thermoplastic resin (A) to be used in the practice of the invention includes polyolefin resins, polystyrene resins and the like. Preferred are polyolefin resins, however.

As such polyolefin resins, there may be mentioned, among others, high-density polyethylene, medium-density polyethylene, (linear) low-density polyethylene, ultralow-density polyethylene, polyethylene copolymerized with vinyl acetate, an acrylate ester or an alpha-olefin such as butene, hexene or 4-methyl-1-pentene, polypropylene homopolymer, polypropylene graft-copolymerized with ethylene, polypropylene copolymerized with an alpha-olefin such as 4-methyl-1-pentene, poly-1-butene, poly-4-methyl-1-pentene and modified polyolefin resins derived from the above-mentioned polyolefins by copolymerization or graft polymerization of an unsaturated carboxylic acid, an acid anhydride thereof, a vinylsilane compound or an epoxy group-containing compound, for instance. Preferred among these are linear low-density polyethylene, low-density polyethylene and polypropylenes. These polyolefin resins should preferably have an MI (melt index measured at 190° C. and under a load of 2,160 g) of 0.1 to 80 g/10 minutes, more preferably 0.2 to 70 g/10 minutes although such MI may vary depending on the MI (same as above; hereinafter the same shall apply) of the resin to be purged. If such MI is below 0.1 g/10 minutes, the melt extrusion moldability will become insufficient. If, conversely, it exceeds 80 g/10 minutes, the ability to purge the resin to be purged will unfavorably decrease.

To be used as the hydrophilic thermoplastic resin (B) are EVOH, PVA, PA and the like.

The "EVOH" to be used here have an ethylene content of 15 to 99 mole %, generally 15 to 70 mole %, preferably 20 to 60 mole %, and a degree of saponification of not less than 90%, preferably not less than 95 mole %. When the ethylene content is lower than 15 mole %, the melt extrusion molding becomes difficult. On the other hand, excessively high ethylene contents are unfavorable since they result in a decrease in the ability to hold the purging auxiliary (C). In addition, in cases where the purging auxiliary (C) is a plasticizer (C1) or water (C2), it is desirable that the upper limit of the ethylene content should be placed at 70% at the highest. In cases where the purging auxiliary (C) is a crystal water-containing compound (C3), the upper limit of the ethylene content can be placed at 99 mole %. Such EVOH species as mentioned above may further contain, in small proportions, one or more comonomers such as propylene, isobutene, α-octene, α-dodecene or the like alphaolefin; an unsaturated carboxylic acid or a salt, partial alkyl ester, complete alkyl ester, nitrile, amide or anhydride thereof; an unsaturated sulfonic acid or a salt thereof; etc.

The above-mentioned "PVA" is not limited to any particular species provided that it can be molded by melt extrusion. Thus, it includes, among others, modified PVA species and PVA species containing one or more specific additives. As examples of the modified PVA species, there may be mentioned oxyalkylene group-containing PVA resins. The oxyalkylene group content in such oxyalkylene group-containing PVA resin is 1 to 60% by weight, preferably 2 to 50% by weight, more particularly 3 to 40% by weight. When said content is below 1% by weight, there may arise problems, for example decreases in extrusion moldability. If, conversely, said content exceeds 60% by weight, the thermal stability will unfavorably become poor. The mean degree of condensation of polyoxyalkylene groups is 3 to 100. Resins having a mean condensation degree less than 3 are poor in extrusion moldability and moreover produce problems, for example decreases in industrial productivity in the step of introducing oxyalkylene groups. When the mean degree of condensation is higher than 100, such a problem as a decrease in extrusion moldability may arise. A preferred range is 3 to 50 and a more preferred range is 5 to 30. Said mean degree of condensation refers to n in the following chemical formulas (1) and (2):

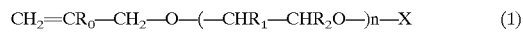

(wherein X is H or —C(=O)—$R_3$ or $R_3$, and $R_0$, $R_1$, $R_2$ and $R_3$ each independently is a hydrogen atom or an alkyl group);

(wherein X is H or —C(=O)—$R_3$ or $R_3$, and $R_0$, $R_1$, $R_2$ and $R_3$ each independently is a hydrogen atom or an alkyl group).

The degree of saponification of fatty acid vinyl ester units in the oxyalkylene group-containing PVA resin is 60 to 100 mole %. A saponification degree less than 60 mole % may unfavorably lead to a decrease in thermal stability.

As examples of the additive-containing PVA species, there may be mentioned PVA species containing one or more additive, such as polyhydric alcohols (ethylene glycol, 1,2-propanediol or propylene glycol, 1,3-propanediol, 1,2-butanediol, 1,3-butanediol, 1,4-butanediol, glycerol, polyethylene oxide, etc.), preferably at an addition level of 0.1 to 50% by weight, more preferably 0.2 to 40% by weight. At an addition level below 0.1% by weight, melt extrusion molding will be impossible. Conversely, at an addition level exceeding 50% by weight, marked viscosity depression will unfavorably result.

Such modified PVA species and the PVA to be used in preparing such additive-containing PVA species preferably have a mean degree of polymerization of 100 to 3,000, more preferably 300 to 2,000, and preferably have a degree of saponification of 80 to 100 mole %, more preferably 90 to 100 mole %. Furthermore, these PVA species may contain, as a comonomer or comonomers, alpha-olefins (ethylene, propylene, long chain alpha-olefin, etc.), ethylenically unsaturated carboxylic acid or like monomers (acrylates, methacrylates, acrylonitrile, vinyl chloride, vinyl ethers, etc.) at levels not exceeding about 30 mole %.

The "PA" includes, among others, polycaproamide (nylon 6), poly-ω-aminoheptanoic acid (nylon 7), polyundecanamide (nylon 11), polylaurolactam (nylon 12), polyethyleneadipamide (nylon 2,6), polytetramethyleneadipamide (nylon 4,6), polyhexamethyleneadipamide (nylon 6,6), polyhexamethylenesebacamide (nylon 2,10), polyhexamethylenedodecanediamide (nylon 6,12), polyoctamethyleneadipamide (nylon 8,6), polydecamethyleneadipamide (nylon 10,6) and polydodecamethylenesebacamide (nylon 12,10) as well as caprolactam-laurolactam copolymer (nylon 6/12), caprolactam-ω-aminononanoic acid copolymer (nylon 6/9), caprolactam-hexamethylenediamine adipate copolymer (nylon 6/6,6), laurolactam-hexamethylenediamine adipate copolymer (nylon 12/6,6), hexamethylenediamine adipate-hexamethylenediamine sebacate copolymer (nylon 6,6/6,10), ethylenediamine adipate-hexamethylenediamine adipate copolymer (nylon 2,6/6,6) and caprolactam-hexamethylenediamine adipate-hexamethylenediamine sebacate copolymer (nylon 6,6/6,10). Noncrystalline polyamides and polycondensates may also be used.

Furthermore, PAs obtained by polycondensation of an aliphatic diamine(s) and an aromatic dicarboxylic acid(s) may also be used. As such aliphatic diamine, there may be mentioned, for example, hexamethylenediamine, 2,2,4-trimethylhexamethylenediamine, 2,4,4-trimethylhexamethylenediamine, 2-methylpentamethylenediamine, bis(4-aminocyclohexyl)methane, 2,2-bis(4-aminocylohexyl)propane, 1,4- or 1,3-diaminocyclohexane, 1,5-diaminopentane, 1,4-diaminobutane, 1,3-diaminopropane and 2-ethyldiaminobutane. These diamines may be used either singly or in combination (two or more may be used simultaneously). As the aromatic dicarboxylic acid, there may be mentioned, among others, isophthalic acid, terephthalic acid, alkyl-substituted isophthalic acid, alkyl-substituted terephthalic acid, naphthalenedicarboxylic acid and diphenyletherdicarboxylic acid. These dicarboxylic acids may be used either alone or in combination (two or more may be used simultaneously).

The proportions of the above-mentioned hydrophobic thermoplastic resin (A) and hydrophilic thermoplastic resin (B) should be 100/0 to 30/70, generally 100/0 to 35/70, preferably 99/1 to 30/70, more preferably 99/1 to 35/65 and most preferably 99/1 to 40/60, as expressed in terms of weight ratio. When the ratio (A)/(B) passes the limit 30/70, the mixed resin composition will unfavorably stick to the wall of the resin flow path.

To be used as the purging auxiliary (C) is at least one member selected from the group consisting of plasticizers (C1) for the resin to be purged, water (C2) and crystal water-containing compounds (C3).

As the plasticizers (C1) for the resin to be purged, there may be mentioned, when the resin to be purged is EVOH or PVA, alcohols such as methanol, ethanol, propanol, butanol, pentanol, etc., polyhydric alcohols such as ethylene glycol, diethylene glycol, triethylene glycol, polyethylene glycol, glycerol, diglycerol, triglycerol, 1,2-propanediol, 1,3-propanediol, 1,2-butanediol, 1,3-butanediol, 1,4-butanediol, 1,5-pentanediol, 1,6-hexanediol, 1,5-hexanediol, 1,3,6-hexanetriol, 1,3,5-hexanetriol, neopentyl glycol, trimethylolpropane, pentaerythritol stearate, pentaerythritol adipate, dipentaerythritol pyrrolidonecarboxylate, dipentaerythritol glutamate, maleic anhydride-modified wood rosin-pentaerythritol, etc., sugar alcohols such as sorbitol, mannitol, dulcitol, etc., and other alcohols, and, further, aromatic sulfonamides such as N-ethyl-o- or p-toluenesulfonamide, o- or p-toluenesulfonamide, N-cyclohexyl-p-toluenesulfonamide, etc., urea, waste molasses, polyethyleneoxazoline, polyvinylpyrrolidone, polyvinylformaldehyde and so forth. Among them, glycerol and sorbitol ate of great use. When the resin to be purged is PA, mention may be made of long chain fatty acid amides such as lauramide, aromatic sulfonamides such as N-ethyl-toluenesulfonamide, N-butyl-toluenesulfonamide, o- or p-toluenesulfonamide, etc., hydroxybenzoate esters such as octyl hydroxybenzoate, hydroxy-containing phthalate esters and so on. Among them, lauramide, o- or p-toluenesulfonamide and octyl p-hydroxybenzoate are particularly useful.

The crystal water-containing compound (C3) is not limited to any particular species provided that its crystals contain water in a certain proportion. The water may occur as $H_2O$ molecules in coordination with salt ions, or not in coordination but existing in a certain proportion to fill spaces in crystal lattices, or as oxonium ions, for instance. Typical examples of such crystal water-containing compound (C3) are calcium chloride hydrates ($CaCl_2.nH_2O$, n=1, 2, 4, 6), barium chloride hydrate ($BaCl_2.2H_2O$), sodium sulfate decahydrate ($Na_2SO_4.10H_2O$), magnesium sulfate hydrates ($MgSO_4.nH_2O$, n=1, 6, 7, 12), manganese sulfate hydrates ($MnSO_4.nH_2O$, n=1, 4, 5, 7), calcium sulfate hydrates ($CaSO_4.nH_2O$, n=0.5, 2), aluminum sulfate hydrates ($Al_2(SO_4)_3.nH_2O$, n=6, 10, 16, 18, 27), aluminum ammonium sulfate hydrate (($NH_4)Al(SO_4)_2.12H_2O$), aluminum potassium sulfate hydrates ($KAl(SO_4)_2.nH_2O$, n=6, 8, 12), magnesium nitrate hydrates ($Mg(NO_3)_2.nH_2O$, n=2, 6), aluminum nitrate hydrates ($Al(NO_3)_3.nH_2O$, n=6, 8, 9), calcium nitrate tetrahydrate ($Ca(NO_3)_2.4H_2O$), sodium carbonate hydrates ($Na_2CO_3.nH_2O$, n=1, 7, 10), magnesium carbonate hydrates ($MgCO_3.nH_2O$, n=1, 3, 5) and the like. Among these, sodium sulfate decahydrate ($Na_2SO_4.10H_2O$) and magnesium nitrate hexahydrate ($Mg(NO_3)_2.6H_2O$ are of particular use.

The proportion of the purging auxiliary (C) is selected within the range of 0.01 to 40 weight parts relative to 100 weight parts of the sum total of the hydrophobic thermoplastic resin (A) plus hydrophilic thermoplastic resin (B). At addition levels below 0.01 weight part, the effect of excluding the resin to be purged sticking to the wall of the resin flow path is insufficient, hence impractical. Conversely, at addition levels exceeding 40 weight parts, the fusion temperature of the purging agent becomes excessively low, leading to failure to exclude the resin to be purged sticking to the wall of the resin flow path.

The optimal range of the content of the purging auxiliary (C) may vary to a certain extent according to the nature thereof. In cases where the purging auxiliary (C) is a plasticizer (C1) for the resin to be purged, said range is 0.01 to 40 weight parts, preferably 0.2 to 35 weight parts, more preferably 0.3 to 30 weight parts. In cases where the purging auxiliary (C) is water (C2), generally the range of 0.1 to 20 weight parts, preferably 0.2 to 18 weight parts, more preferably 0.3 to 15 weight parts, is employed within the range mentioned hereinabove. In cases where the purging auxiliary (C) is a crystal water-containing compound (C3), generally the range of 0.1 to 20 weight parts, preferably 0.15 to 15 weight parts, more preferably 0.15 to 12 weight parts, as expressed in terms of water of crystallization, is employed within the range mentioned hereinabove.

The order of incorporation of the above-mentioned components (A), (B) and (C) is not critical but may be arbitrary. For instance, when the purging auxiliary (C) is a plasticizer (C1), the hydrophobic thermoplastic resin (A), hydrophilic thermoplastic resin (B) and plasticizer (C1), each as such, may be fed together to an injection or extrusion molding machine to prepare a purging agent, or the hydrophobic thermoplastic resin (A) and a mixture of the hydrophilic thermoplastic resin (B) and purging auxiliary (C) are fed to an extrusion molding machine for pelletizing.

In cases where the purging auxiliary (C) is water (C2), (1) water or water vapor or the like may directly be allowed to be contained in the above-mentioned (A) and/or (B) or (2) a metal hydroxide may be fusion-blended with the above-mentioned (A) and (B) to thermally cause moisture generation, for instance. In carrying out the method (1), the order of incorporation (blending) of the components (A) to (C2) is not critical but arbitrary. It is indeed possible to melt-mold the above-mentioned components (A) to (C2) to give a purging agent according to the present invention but, since the content of water (C2) is difficult to control, it is particularly preferred to mix the hydrophilic thermoplastic resin (B) in a hydrous state with the hydrophobic thermoplastic resin (A). More specifically, for instance, in the latter case, the hydrophilic thermoplastic resin (B) may be immersed in cold or warm or hot water at about 0° to 90° C. for 0.1 to 10 hours and, after attaining a water content within the range specified by the present invention, blended with the hydrophobic thermoplastic resin (A), or the water content of the hydrophilic thermoplastic resin (B) may be adjusted in the drying step in its production process, followed by blending of said resin (B) with the hydrophobic thermoplastic resin (A).

In blending the hydrated hydrophilic thermoplastic resin (B) with the hydrophobic thermoplastic resin (A), a per se known agitator such as a tumbler, Henschel mixer or ribbon blender may be used.

In carrying out the method (2), a metal oxide, in an amount to give such a water content as specified above, may be fusion-blended with (A) and/or (B) or with a mixture of (A) and (B) at 150° to 250° C. The amount of such metal hydroxide to be submitted to said blending may vary depending on the species thereof. Generally, however, an amount of 1 to 60 weight parts per 100 weight parts of (A)+(B) is used. As such metal hydroxide, there may be mentioned $Al(OH)_3$ and $Mg(OH)_2$, among others.

In cases where the purging auxiliary (C) is a crystal water-containing compound (C3), the hydrophobic thermoplastic resin (A), hydrophilic thermoplastic resin (B) and crystal water-containing compound (C3), each as such, may be fed together to an injection or extrusion molding machine to give a purging agent according to the present invention, or the hydrophobic thermoplastic resin (A) and a mixture of the hydrophilic thermoplastic resin (B) and crystal water-containing compound (C3) may be fed to an extrusion molding machine for pelletizing, or (A) to (C3) may be fed together to a pressure kneader for kneading and grinding to give a ground product, for instance.

In the practice of the present invention, it is also possible to reuse the purging agent once used for purging after readjusting to the above-mentioned proportions of (A) to (C) and it is further possible to prepare a purging agent according to the present invention by using scraps of moldings from a resin composition comprising (A) and (B) and adjusting the proportions of (A) and (B) and the content of (C).

In the purging agent of the present invention, there may be incorporated, as necessary, one or more additives, for example heat stabilizers such as hindered phenols, hindered amines, etc., powders of metal salts and inorganic materials such as calcium acetate, magnesium acetate, silica, titanium oxide, calcium carbonate, etc., metal soaps, silicones, fluorine-containing fatty acid esters, amide lubricants, pigments, foaming agents, surfactants, plasticizers and so forth, each in an amount which will not adversely affect the effects of the present invention.

The resin (D) to be purged by the purging agent of the present invention may be EVOH, PVA or PA. Such EVOH is selected from those EVOH species mentioned hereinabove in relation to the hydrophilic thermoplastic resin (B) and may be the same or different in ethylene content and/or saponification degree of EVOH as or from the species used in the purging agent. The same applies to PVA and PA as well.

When the resin to be purged (D) is identical in kind with the hydrophilic thermoplastic resin (B), purging can advantageously be finished in a shorter period of time. Thus, when the resin to be purged (D) is EVOH, EVOH is preferably used as the hydrophilic thermoplastic resin (B); when the resin to be purged (D) is PVA, PVA is preferably used as the hydrophilic thermoplastic resin (B); and when the resin to be purged (D) is PA, PA is preferably used as the hydrophilic thermoplastic resin (B).

The melt extrusion apparatus in which the purging agent of the present invention can suitably be used is not limited to any particular type. Thus, the purging agent of the present invention can be used in single-screw extruders, twin-screw extruders, single-layer film extruders, single-layer inflation extruders, injection molding machines, multi-layer extruders, multi-layer inflation extruders, multi-layer blow extruders, coextrusion injection molding machines and so forth.

As regards the method of use of the purging agent, the purging agent is generally charged after disappearance, from the hopper inside, of the resin to be purged (D). The amount to be charged is about 6 to 30 times the residual amount of the resin to be purged (D). On that occasion, the screw revolution speed may be increased and/or the extrusion temperature may be varied. After completion of the purging, the purging agent can be changed over directly to the resin to be purged (D) or to another resin such as polyolefin, polystyrene, polyester, polyvinyl chloride, polyvinylidene chloride or the like. In cases where, after completion of the purging, the temperature of the extruder is lowered for stopping purging operation and then the extruder is restarted with the resin to be purged (D), the resin to be purged (D) is charged after disappearance of the purging agent from the hopper inside. In this instance, too, the screw revolution speed may be increased and/or the extrusion temperature may be varied. The changeover on the occasion of restarting may be made not only to the original resin to be purged (D) but also to another resin such as polyolefin, polystyrene, polyester, polyvinyl chloride, polyvinylidene chloride or the like.

The following examples are further illustrative of the present invention.

In the examples, "%" means "% by weight" unless otherwise specified.

EXAMPLE 1

Linear low-density polyethylene [Idemitsu Polyethylene L 0434, MI (190° C., 2,160 g)=4 g/10 minutes] was used as the hydrophobic thermoplastic resin (A), and EVOH [ethylene content 32 mole %, saponification degree 99.6 mole %, MI (230° C., 2,160 g)=3 g/10 minutes] as the hydrophilic thermoplastic resin (B). These were blended in a weight ratio of (A)/(B)=90/10 and 5 weight parts of glycerol, employed as the plasticizer (C1) for EVOH, was admixed with 100 weight parts of the blend (A) plus (B). This mixture was fed to a twin-screw extruder (Plastic Kogaku Kenkyusho model BT-30-S2-42-L) and a purging agent of the present invention was obtained in pellet form by extrudion under the following temperature conditions: feed zone=180° C., compression zone=210° C., metering zone= 210° C.

Such purging agent was evaluated in the following manner.

Using a single-screw extruder (L/D=28) and a Brabender Plasticorder (PLE331) equipped with a fish tail (die width 100 mm), EVOH (same as above) containing a black colorant was extruded as the resin to be purged (D) for 30 minutes under the temperature conditions: feed zone=200° C., compression zone=230° C., metering zone=230° C., die=230° C. Thereafter, the purging agent mentioned above was run for 30 minutes under the same conditions. Then, the die was overhauled to macroscopically examine the inside metal surface of the die for adhesion of the resin to be purged (I).

Separately, the EVOH was extruded for 30 minutes under the same conditions as mentioned above, the purging agent was then run for 30 minutes under the same conditions, and the operation of the extruder was suspended. Half a day later, the extruder was restarted with changeover from the purging agent to the resin to be purged. For film appearance evaluation of the resin to be purged, film sampling was performed after the lapse of 30 miniutes from restart and gels occurring in a film sample (5×10 cm) were counted (II). Further, the fish tail die surface was examined by the eye for purging agent adhesion (III).

The evaluation criteia used were as follows:
[Resin adhesion to die inside metal surface (I)]
⊚—Adhesion of the resin to be purged hardly observed.
○—Slight adhesion of the resin to be purged.
x—Considerable adhesion of the resin to be purged.
[Number of gels occurring in film (II)]
⊚—0 to 1.
○—2 to 4.
Δ—5 to 9.
x—10 or more.
[Resin adhesion to fish tail die surface (III)]
⊚—Adhesion of the purging agent hardly observed.
○—Slight adhesion of the purging agent.
x—Considerable adhesion of the purging agent.

EXAMPLE 2

The procedure of Example 1 was followed and evaluation was made in the same manner except that another species of EVOH [ethylene content 29 mole %, saponification degree 99.6 mole %, MI (230° C., 2,160 g)=3 g/10 minutes] was used as the resin to be purged (D).

EXAMPLE 3

The procedure of Example 1 was followed and evaluation was made in the same manner except that glycerol was used in an amount of 0.5 weight parts.

EXAMPLE 4

The procedure of Example 1 was followed and evaluation was made in the same manner except that glycerol was used in an amount of 20 weight parts.

EXAMPLE 5

The procedure of Example 1 was followed and evaluation was made in the same manner except that 5 weight parts of sorbitol was used in lieu of glycerol.

EXAMPLE 6

The procedure of Example 1 was followed and evaluation was made in the same manner except that 5 weight parts of polyethylene glycol with a polymerization degree of 600 was used in lieu of glycerol.

EXAMPLE 7

The procedure of Example 1 was followed and evaluation was made in the same manner except that an (A)/(B) weight ratio of 70/30 was used.

EXAMPLE 8

The procedure of Example 1 was followed and evaluation was made in the same manner except that an (A)/(B) weight ratio of 50/50 was used.

EXAMPLE 9

The procedure of Example 1 was followed and evaluation was made in the same manner except that an (A)/(B) weight ratio of 100/0 was used.

EXAMPLE 10

The procedure of Example 1 was followed and evaluation was made in the same manner except that low-density polyethylene [product of Mitsubishi Chemical, LF625H, MI (190° C., 2,160 g)=6 g/10 minutes] was used as the hydrophobic thermoplastic resin (A).

EXAMPLE 11

The procedure of Example 1 was followed and evaluation was made in the same manner except that an oxyalkylene group-containing PVA resin [oxyalkylene group content 25 weight %, polymerization degree of PVA 500, saponification degree 95 mole %, MI (230° C., 2,160 g)=3 g/10 minutes] was used as the hydrophilic thermoplastic resin (B) and as the resin to be purged (D) as well.

EXAMPLE 12

The procedure of Example 1 was followed and evaluation was made in the same manner except that a hydroxybenzoate ester (2-ethylhexyl p-hydoxybenzoate) was used as the plasticizer (C1) and a nylon 6/66 copolymer (product of Mitsubishi Chemical, Novamid EN220) as the hydrophilic thermoplastic resin (B) and as the resin to be purged (D) as well.

COMPARATIVE EXAMPLE 1

The procedure of Example 1 was followed and evaluation was made in the same manner except that an (A)/(B) weight ratio of 20/80 was used.

COMPARATIVE EXAMPLE 2

The procedure of Example 1 was followed and evaluation was made in the same manner except that the hydrophobic thermoplastic resin (A) was not used.

COMPARATIVE EXAMPLE 3

The procedure of Example 1 was followed and evaluation was made in the same manner except that the plasticizer (C1) was used in an amount of 50 weight parts.

COMPARATIVE EXAMPLE 4

The procedure of Example 1 was followed and evaluation was made in the same manner except that the plasticizer (C1) was not used.

COMPARATIVE EXAMPLE 5

The procedure of Example 1 was followed and evaluation was made in the same manner except that low density polyethylene [Idemitsu Polyethylene L 0134, MI (190° C., 2,160 g)=1 g/10 minutes] alone was used as the purging agent.

The evaluation results of the examples and comparative examples are shown below in Table 1.

TABLE 1

|  | Evaluation (I) | Evaluation (II) | Evaluation (III) |
| --- | --- | --- | --- |
| Example 1 | ⊚ | ⊚ | ⊚ |
| Example 2 | ⊚ | ⊚ | ⊚ |
| Example 3 | ⊚ | ⊚ | ⊚ |
| Example 4 | ⊚ | ⊚ | ⊚ |

TABLE 1-continued

|  | Evaluation (I) | Evaluation (II) | Evaluation (III) |
|---|---|---|---|
| Example 5 | ⊚ | ⊚ | ⊚ |
| Example 6 | ⊚ | ⊚ | ⊚ |
| Example 7 | ⊚ | ⊚ | ⊚ |
| Example 8 | ○ | ○ | ⊚ |
| Example 9 | ○ | ○ | ⊚ |
| Example 10 | ⊚ | ⊚ | ⊚ |
| Example 11 | ⊚ | ⊚ | ⊚ |
| Example 12 | ⊚ | ⊚ | ⊚ |
| Comp. Ex. 1 | x | x | ⊚ |
| Comp. Ex. 2 | x | x | ○ |
| Comp. Ex. 3 | x | ○ | ○ |
| Comp. Ex. 4 | x | x | x |
| Comp. Ex. 5 | ○ | x | x |

Note: Evaluations (I) to (III) respectively mean the evaluation items (I) to (III) mentioned in Example 1.

EXAMPLE 13

EVOH [ethylene content 32 mole %, saponification degree 99.6 mole %, MI (210° C., 2,160 g)=3 g/10 minutes, cylindrical pellets] was used as the hydrophilic thermoplastic resin (B). Such EVOH was immersed in hot water (90° C.) for 5 hours to give hydrous EVOH with a water content of about 20%.

Then, the above hydrous EVOH was dry-blended with linear low-density polyethylene [Idemitsu Polyethylene L 0434N, MI (190° C., 2,160 g)=4 g/10 minutes], which was used as the hydrophobic thermoplastic resin (A), in a weight ratio of (A)/(B)=75/25 to give a purging agent according to the present invention [the content of water (C2) being 6 weight parts per 100 weight parts of (A+B)].

Such purging agent was evaluated in the same manner as in Example 1.

EXAMPLE 14

The procedure of Example 13 was followed and evaluation was made in the same manner except that an (A)/(B) weight ratio of 90/10 [the content of water (C2) being 2.5 weight parts per 100 weight parts of (A+B)] was employed in the dry blending.

EXAMPLE 15

The procedure of Example 13 was followed and evaluation was made in the same manner except that a different EVOH species [ethylene content 44 mole %, saponification degree 99.6 mole %, MI (210° C., 2,160 g)=12 g/10 minutes] was used as the resin to be purged (D),

EXAMPLE 16

The procedure of Example 13 was followed and evaluation was made in the same manner except that the water content of EVOH was increased to 25% [the content of water (C2) being 8 weight parts per 100 weight parts of (A+B)].

EXAMPLE 17

The procedure of Example 13 was followed and evaluation was made in the same manner except that a nylon 6/66 copolymer (product of Mitsubishi Chemical, Novamid EN220) was used as the hydrophilic thermoplastic resin (B) and as the resin to be purged (D) as well.

EXAMPLE 18

The procedure of Example 13 was followed and evaluation was made in the same manner except that low-density polyethylene [product of Mitsubishi Chemical, LF625H, MI (190° C., 2,160 g)=6 g/10 minutes] was used as the hydrophobic thermoplastic resin (A).

EXAMPLE 19

The procedure of Example 13 was followed and evaluation was made in the same manner except that an oxyalkylene group-containing PVA resin [oxyalkylene group content 25 weight %, polymerization degree of PVA 500, saponification degree 95 mole %, MI (210° C., 2,160 g)=3 g/10 minutes] was used as the hydrophilic thermoplastic resin (B) and as the resin to be purged (D) as well and that hydrous pellets were prepared by immersing in cold water (about 10° C.) for 1 hour.

EXAMPLE 20

The procedure of Example 13 was followed and evaluation was made in the same manner except that EVOH [ethylene content 32 mole %, saponification degree 99.6 mole %, MI (210° C., 2,160 g)=3 g/10 minutes] with a water content of 20% as adjusted in the drying step in the process of production thereof [the content of water (C2) being 6 weight parts per 100 weight parts of (A+B)] was used as the hydrophilic thermoplastic resin (B).

EXAMPLE 21

The procedure of Example 13 was followed and evaluation was made in the same manner except that the same linear low-density polyethylene and EVOH as used in Example 13 were used and 90 weight parts of the linear low-density polyethylene, 10 weight parts of the EVOH and 16 weight parts of Al(OH)$_3$ were melt-blended at 200° C. to give a purging agent with a water content of 4.7%.

COMPARATIVE EXAMPLE 6

The procedure of Example 13 was followed and evaluation was made in the same manner except that an (A)/(B) weight ratio of 20/80 was used.

COMPARATIVE EXAMPLE 7

The procedure of Example 13 was followed and evaluation was made in the same manner except that the hydrophobic thermoplastic resin (A) was not used.

COMPARATIVE EXAMPLE 8

The procedure of Example 13 was followed and evaluation was made in the same manner except that the water content of EVOH was increased to 55% [the content of water (C2) being 30 weight parts per 100 weight parts of (A+B)].

COMPARATIVE EXAMPLE 9

The procedure of Example 13 was followed and evaluation was made in the same manner except that the addition of water (C2) was omitted (the water content was reduced to less than 0.1% by thermodrying the EVOH).

COMPARATIVE EXAMPLE 10

The procedure of Example 13 was followed and evaluation was made in the same manner except that low-density polyethylene [Idemitsu Polyethylene L 0134, MI (190° C., 2,160 g)=1 g/10 minutes] alone was used as the purging agent.

The evaluation results obtained in Examples 13 to 21 and Comparative Examples 6 to 10 are shown in Table 2.

TABLE 2

|  | Evaluation (I) | Evaluation (II) | Evaluation (III) |
|---|---|---|---|
| Example 13 | ◉ | ◉ | ◉ |
| Example 14 | ◉ | ◉ | ◉ |
| Example 15 | ◉ | ◉ | ◉ |
| Example 16 | ◉ | ◉ | ◉ |
| Example 17 | ◉ | ◉ | ◉ |
| Example 18 | ◉ | ◉ | ◉ |
| Example 19 | ◉ | ◉ | ◉ |
| Example 20 | ◉ | ◉ | ◉ |
| Example 21 | ◉ | ◉ | ◉ |
| Comp. Ex. 6 | x | x | ◉ |
| Comp. Ex. 7 | x | x | ○ |
| Comp. Ex. 8 | x | ○ | ○ |
| Comp. Ex. 9 | x | x | x |
| Comp. Ex. 10 | ○ | x | x |

Note: Evaluations (I) to (III) respectively mean the evaluation items (I) to (III) mentioned in Example 1.

EXAMPLE 22

Linear low-density polyethylene [Idemitsu Polyethylene L 0434N, MI (190° C., 2,160 g)=4 g/10 minutes] was used as the hydrophobic thermoplastic resin (A) and EVOH [ethylene content 32 mole %, saponification degree 99.6 mole %, MI (210° C., 2,160 g)=3 g/10 minutes] as the hydrophilic thermoplastic resin (B). These were blended with each other in a weight ratio of (A)/(B)=80/20, followed by admixing with 12 weight parts, per 100 weight parts of the blend (A)+(B), of sodium sulfate decahydrate ($Na_2SO_4.10H_2O$) (in terms of water of crystallization, about 3.3 moles per kg) as the crystal water-containing compound (C3). This mixture was fed to a twin-screw extuder (Plastic Kogyo Kenkyusho model BT-30-S2-42-L) and extruded under the temperature conditions: feeding zone=180° C., compression zone=210° C., metering zone=210° C. Thus was obtained a pellet-form purging agent according to the present invention.

Such purging agent was evaluated in the same manner as in Example 1.

EXAMPLE 23

The procedure of Example 22 was followed and evaluation was made in the same manner except that 6.5 weight parts (in terms of water of crystallization, about 1.4 moles per kg) of magnesium nitrate hexahydrate ($Mg(NO_3)_2.6H_2O$) was used as the crystal water-containing compound (C3).

EXAMPLE 24

The procedure of Example 22 was followed and evaluation was made in the same manner except that sodium sulfate decahydrate ($Na_2SO_4.10H_2O$) was used as the crystal water-containing compound (C3) in an amount of 18 weight parts (in terms of water of crystallization, about 4.7 moles per kg).

EXAMPLE 25

The procedure of Example 22 was followed and evaluation was made in the same manner except that blending was made in an (A)/(B) weight ratio of 70/30 and that 20 weight parts (in terms of water of crystallization, about 3.0 moles per kg) of calcium nitrate tetrahydrate ($Ca(NO_3)_2.4H_2O$) was used as the crystal water-containing compound (C3).

EXAMPLE 26

The procedure of Example 22 was followed and evaluation was made in the same manner except that EVOH [ethylene content 29 mole %, saponification degree 99.6 mole %, MI (210° C., 2,160 g)=3 g/10 minutes] was used as the resin to be purged (D).

EXAMPLE 27

The procedure of Example 22 was followed and evaluation was made in the same manner except that low-density polyethylene (product of Mitsubishi Chemical, LF625H, MI (190° C., 2,160 g)=6 g/10 minutes] was used as the hydrophobic thermoplastic resin (A).

EXAMPLE 28

The procedure of Example 22 was followed and evaluation was made in the same manner except that an oxyalkylene group-containing PVA resin [oxyalkylene group content 25 weight %, polymerization degree of PVA 500, saponification degree 95 mole %, MI (210° C., 2,160 g)=3 g/10 minutes) was used as the hydrophilic thermoplastic resin (B) and as the resin to be purged (D).

EXAMPLE 29

The procedure of Example 22 was followed and evaluation was made in the same manner except that a nylon 6/66 copolymer (product of Mitsubishi Chemical, Novamid EN220) was used as the hydrophilic thermoplastic resin (B) and as the resin to be purged (D) as well.

COMPARATIVE EXAMPLE 11

The procedure of Example 22 was followed and evaluation was made in the same manner except that an (A)/(B) weight ratio of 20/80 was used.

COMPARATIVE EXAMPLE 12

The procedure of Example 22 was followed and evaluation was made in the same manner except that the addition of the hydrophobic thermoplastic resin (A) was omitted.

COMPARATIVE EXAMPLE 13

The procedure of Example 22 was followed and evaluation was made in the same manner except that the crystal water-containing compound (C3) was added in an amount of 80 weight parts (in terms of water of crystallization, about 13.8 moles per kg).

COMPARATIVE EXAMPLE 14

The procedure of Example 22 was followed and evaluation was made in the same manner except that the addition of the crystal water-containing compound (C3) was omitted.

COMPARATIVE EXAMPLE 15

The procedure of Example 22 was followed and evaluation was made in the same manner except that low-density polyethylene [Idemitsu Polyethylene L 0134, MI (190° C., 2,160 g)=1 g/10 minutes] alone was used as the purging agent.

The evaluation results obtained in Examples 22 to 29 and Comparative Examples 11 to 15 are shown in Table 3.

TABLE 3

|  | Evaluation (I) | Evaluation (II) | Evaluation (III) |
| --- | --- | --- | --- |
| Example 22 | ⊚ | ⊚ | ⊚ |
| Example 23 | ⊚ | ⊚ | ⊚ |
| Example 24 | ⊚ | ⊚ | ⊚ |
| Example 25 | ⊚ | ⊚ | ⊚ |
| Example 26 | ⊚ | ⊚ | ⊚ |
| Example 27 | ⊚ | ⊚ | ⊚ |
| Example 28 | ⊚ | ⊚ | ⊚ |
| Example 29 | ⊚ | ⊚ | ⊚ |
| Comp. Ex. 11 | x | x | ⊚ |
| Comp. Ex. 12 | x | x | ○ |
| Comp. Ex. 13 | x | ○ | ○ |
| Comp. Ex. 14 | x | x | x |
| Comp. Ex. 15 | ○ | x | x |

Note: Evaluations (I) to (III) respectively mean the evaluation items (I) to (III) mentioned in Example 1.

As detailed described hereinabove, the purging agent of the present invention, which comprises a hydrophobic thermoplastic resin (A), a hydrophilic thermoplastic resin (B) and a specific purging auxiliary (C) as compounded in specific proportions, can purge quickly the residual resin firmly sticking to the metal surface in the flow path in melt-molding apparatus for hydrophilic thermoplastic resins such as EVOH,. PVA and PAs. When EVOH, PVA or a PA is charged again into the flow path, the purging agent will not remain, hence the product loss can be much reduced.

What is claimed is:

1. A method of purging a resin from a melt flow path of a melt extrusion apparatus, the method comprising:

charging the melt extrusion apparatus, after extruding the resin until a residual amount of the resin remains in the melt flow path, with an effective amount of a purging agent which further comprises:

(A) a hydrophobic thermoplastic resin containing a polyolefin resin, (B) a hydrophilic thermoplastic resin containing at least one resin selected from the group consisting of saponified ethylene-vinyl acetate copolymers, polyvinyl alcohol resins and polyamide resins, and (C) at least one purging auxiliary selected from the group consisting of (C1) a plasticizer usable with the resin to be purged, which is selected from the group consisting of alcohols, aromatic sulfonamides, long chain fatty acid amides, hydroxybenzoate esters, urea and waste molasses, (C2) water and (C3) a crystal water-containing compound, wherein the ratio of the hydrophobic thermoplastic resin (A) to the hydrophilic thermoplastic resin (B) is 99/1 to 30/70 by weight and the ratio of the purging auxiliary (C) relative to 100 parts by weight of the sum total of the hydrophobic thermoplastic resin (A) plus hydrophilic thermoplastic resin (B) is 0.01 to 40 parts by weight, said purging agent not substantially adhering to the melt flow path; and extruding to substantial completion the effective amount of purging agent charged to the melt extrusion apparatus, whereby the residual amount of resin remaining in the melt flow path is substantially purged and the purging agent remaining, if any, in the melt flow path will also be substantially purged upon extruding further resin in the melt extrusion apparatus.

2. The method as claimed in claim 1, wherein the ratio of the purging auxiliary (c) relative to 100 parts by weight of the sum total of the hydrophobic thermoplastic resin (A) plus hydrophilic thermoplastic resin (B) is 0.01 to 40 parts by weight when said auxiliary (C) is said plasticizer (C1), 0.1 to 20 parts by weight when said auxiliary (C) is water (C2) or 0.1 to 20 parts by weight when said auxiliary (C) is a crystal water-containing compound (C3).

3. The method as claimed in claim 1, wherein the alcohols comprise polyhydric alcohols or sugar alcohols.

4. The method as claimed in claim 1, wherein the crystal water-containing compound (C3) comprises at least one compound selected from the group consisting of sodium sulfate decahydrate, magnesium nitrate hexahydrate, calcium nitrate tetrahydrate and aluminum ammonium sulfate hydrate.

5. The method as claimed in claim 1, wherein the resin to be purged comprises at least one resin selected from the group consisting of saponified ethylene-vinyl acetate copolymers, polyvinyl alcohol resins and polyamide resins.

6. The method as claimed in claim 1, wherein the effective amount of the purging agent is charged to the melt extrusion apparatus after the disappearance of the resin from a hopper inside the melt extrusion apparatus.

7. The method as claimed in claim 1, wherein the effective amount of purging agent charged to the melt extrusion apparatus is 6 to 30 times the residual amount of the resin to be purged.

8. A method of purging a resin from a melt flow path of a melt extrusion apparatus, the method comprising:

charging the melt extrusion apparatus, after extruding the resin until a residual amount of the resin remains in the melt flow path, with an effective amount of a purging agent which further comprises:

(A) a hydrophobic thermoplastic resin containing a polyolefin resin, (B) a hydrophilic thermoplastic resin containing at least one resin selected from the group consisting of saponified ethylene-vinyl acetate copolymers, polyvinyl alcohol resins and polyamide resins, and (C) at least one purging auxiliary selected from the group consisting of (C1) a plasticizer usable with the resin to be purged, which is selected from the group consisting of alcohols, aromatic sulfonamides, long chain fatty acid amides, hydroxybenzoate esters, urea and waste molasses, (C2) water and (C3) a crystal water-containing compound, wherein the ratio of the hydrophobic thermoplastic resin (A) to the hydrophilic thermoplastic resin (B) is 99/1 to 30/70 by weight and the ratio of the purging auxiliary (C) relative to 100 parts by weight of the sum total of the hydrophobic thermoplastic resin (A) plus hydrophilic thermoplastic resin (B) is 0.01 to 40 parts by weight, said purging agent not substantially adhering to the melt flow path; and extruding to substantial completion the effective amount of purging agent charged to the melt extrusion apparatus, whereby the residual amount of resin remaining in the melt flow path is substantially purged and the purging agent remaining, if any, in the melt flow path will also be substantially purged upon extruding further resin in the melt extrusion apparatus;

changing the temperature of the melt extrusion apparatus from a first temperature to a second temperature lower than said first temperature;

stopping the melt extrusion apparatus;

restarting the melt extrusion apparatus; and charging the melt extrusion apparatus with further resin.

9. The method as claimed in claim 8, wherein the ratio of the purging auxiliary (C) relative to 100 parts by weight of the sum total of the hydrophobic thermoplastic resin (A) plus hydrophilic thermoplastic resin (B) is 0.01 to 40 parts by weight when said auxiliary (C) is said plasticizer (C1), 0.1 to 20 parts by weight when said auxiliary (C) is water (C2) or 0.1 to 20 parts by weight when said auxiliary (C) is a crystal water-containing compound (C3).

10. The method as claimed in claim 8, wherein the alcohols comprise polyhydric alcohols or sugar alcohols.

11. The method as claimed in claim 8, wherein the crystal water-containing compound (C3) comprises at least one compound selected from the group consisting of sodium sulfate decahydrate, magnesium nitrate hexahydrate, calcium nitrate tetrahydrate and aluminum ammonium sulfate hydrate.

12. The method as claimed in claim 8, wherein the resin to be purged comprises at least one resin selected from the group consisting of saponified ethylene-vinyl acetate copolymers, polyvinyl alcohol resins and polyamide resins.

13. The method as claimed in claim 8, wherein the effective amount of the purging agent is charged to the melt extrusion apparatus after the disappearance of the resin to be purged from a hopper inside the melt extrusion apparatus.

14. The method as claimed in claim 8, wherein the effective amount of purging agent charged to the melt extrusion apparatus is 6 to 30 times the residual amount of the resin to be purged.

* * * * *